United States Patent [19]

Pirz et al.

[11] 4,454,586

[45] Jun. 12, 1984

[54] METHOD AND APPARATUS FOR GENERATING SPEECH PATTERN TEMPLATES

[75] Inventors: Frank C. Pirz, Madison; Lawrence R. Rabiner, Berkeley Heights; Jay G. Wilpon, Warren, all of N.J.

[73] Assignee: AT&T Bell Laboratories, Murray Hill, N.J.

[21] Appl. No.: 322,748

[22] Filed: Nov. 19, 1981

[51] Int. Cl.³ .............................................. G10L 1/00
[52] U.S. Cl. ................................... 364/513.5; 381/41
[58] Field of Search ....................... 381/41, 43, 42, 44, 381/45, 51-53; 364/513.5

[56] References Cited

U.S. PATENT DOCUMENTS 3,909,532  9/1975  Rabiner et al. ......................... 179/1
4,060,694  11/1977  Suzuki et al. ............................ 179/1

OTHER PUBLICATIONS

Itakura, IEEE Trans. on Acoustics, Speech & Signal Processing, vol. ASSP-23, Feb. 1975, pp. 67–72.

Primary Examiner—E. S. Matt Kemeny
Attorney, Agent, or Firm—Jack S. Cubert

[57] ABSTRACT

A system for generating speech pattern templates for use with either speech recognition or speech synthesis. Reference demisyllable templates are first generated from a reference first speaker using both manual and automatic analysis. The analysis for a second speaker is simplified and automated by comparing with the first speaker's templates. The second speaker speaks the same words at a rate time-warped to match the first speakers rate and template. We define a demisyllable as each of the two halves of a syllable, assuming a syllable starts and ends with a noisy consonant, and the syllable is split at its vowel center, thereby simplifying concatenation and comparison. Key features of the invention include generating a set of signals representative of the time alignment between the first and second speaker's templates, and the time-of-occurence boundaries of each syllable in a word.

21 Claims, 3 Drawing Figures

METHOD AND APPARATUS FOR GENERATING SPEECH PATTERN TEMPLATES

TECHNICAL FIELD

Our invention relates to speech processing and, more particularly, to speech pattern generation for automatic speech synthesis and recognition.

While people find speech a convenient and efficient means for communication, machines are generally organized by programmed arrangements to communicate by means of switches, keyboards and displays in coded formats. Advances in electronic technology have made it possible to provide a speech interface for machines such as computers or automatic control equipment. In accordance with known techniques, machine signals are supplied to a speech synthesizer having a stored vocabulary of coded speech elements. The synthesizer concatenates a speech pattern corresponding to the machine signals from the stored elements. The speech pattern is then converted into a spoken message via an electroacoustic transducer. A speech recognizer receives an utterance and compares the utterance pattern to previously stored speech patterns. the utterance may be identified as the best matching stored pattern and a machine signal corresponding to the matched pattern is generated. Voice communication with machines is thereby accomplished.

In one form of speech synthesis, speech patterns are recorded to provide a stored vocabulary. Responsive to a coded signal, selected patterns are retrieved from the stored vocabulary of speech elements and assembled into a message signal. The message signal is then converted to a sound sequence. The basic speech units in the stored vocabulary may be large message units. If an extensive vocabulary is required, the amount of storage for the different message speech patterns becomes uneconomical.

The use of submessage unit patterns allows greater flexibility in formation of messages and smaller vocabulary storage requirements. Subword speech units such as phonemes, allephones, demisyllables or dyads, for example, allow a large variety of messages to be generated from a very limited stored vocabulary. For example, a relatively small set of syllable subunit patterns or demisyllable subunit patterns may be used to synthesize any message. As is well known in the art, subword speech units are generally produced from word length patterns of ordinary speech by time consuming human analysis, that includes intervention and modification by experts. An arrangement illustrating a combination of manual and automatic determination of speech pattern subunits is described in the article "Automatic Labeling of Continuous Speech With a Given Phonetic Transcription Using Dynamic Programming Algorithms", by Michael Wagner, appearing in the Proceedings of ICASSP '81, pp. 1156-1159, April 1981.

Most speech recognition systems are adapted to receive input speech signals and to transform these speech signals into a sequence of prescribed acoustic features. The input speech acoustic feature sequence is compared to stored sets of previously obtained reference features for identified speech units. The speech signal is identified when the input speech feature sequence matches a stored set of reference features in accordance with predetermined criteria. Where the reference speech units are spoken words, reference speech feature templates may be derived directly from utterances of the spoken word. Word, phrase or sentence templates are useful for limited vocabularies. The template storage requirements for larger vocabularies, however, becomes uneconomical.

As in speech synthesis, it is desirable to limit the template storage requirements of speech recognizers through the use of submessage unit speech patterns. Stored submessage unit templates can be used directly in a speech recognizer to identify an input speech pattern as in U.S. Pat. No. 3,770,892 issued to G. L. Clapper on Nov. 6, 1973 or can be selectively concatenated to form longer message pattern templates. In recognizers adapted to speech patterns of particular speakers, it is necessary to obtain a vocabulary of submessage unit reference templates for each user of the system. Speaker independent arrangements adapted to recognize the speech patterns of any speaker require a set of submessage unit templates representative of a large population. Consequently, a number of submessage unit templates must be generated after the averaging or clustering of speech pattern features obtained from many speakers.

Ideally, a set of submessage unit templates should be generated for each individual whose speech is to be recognized. But the complex and time consuming template formation procedure makes it difficult to produce more than a few template sets in this manner. U.S. Pat. No. 4,060,694 issued to M. Suzuki et al on Nov. 29, 1977 discloses a speech recognition arrangement adapted to a plurality of different speakers. In this system, a set of phoneme characteristic parameters are obtained for a single speaker. Instead of forming additional phoneme characteristics for other speakers, the previously generated phoneme characteristics are artificially varied to produce a range of phoneme characteristic sets.

Prior to recognition of an utterance, the most similar phoneme set to the utterance is chosen from the artificially generated range. In this manner, the time consuming phoneme generation procedure is avoided. The artificial phoneme set, however, only approximates actual differences in voice and pronunciation characteristics to an uncertain extent. Consequently, the use of artificially formed phoneme sets increases the degree of uncertainty in recognition results. It is an object of the invention to provide improved submessage unit template formation without manual analysis or resort to artificial variations of a known subunit speech pattern.

BRIEF SUMMARY OF THE INVENTION

The invention is directed to a speech pattern subunit generation arrangement in which a plurality of reference speech pattern templates are stored. Each template comprises a sequence of acoustic feature signals representative of a prescribed spoken reference speech pattern. For each reference speech pattern template, a set of the time of occurrence of signals representative of a predetermined subunit in said reference speech pattern template feature signal sequence is also stored. An utterance of a prescribed reference speech pattern is analyzed to generate a sequence of acoustic feature signals representative of the utterance. Responsive to the stored reference speech pattern feature signal sequence and the reference speech pattern utterance feature signal sequence, a set of signals representing the time alignment of the utterance feature signals with the stored feature signals is formed. The sequence of utterance feature signals corresponding to the predetermined subunit in the stored reference speech pattern template is determined responsive to the time alignment signals and the stored predetermined subunit representative signals.

In accordance with one aspect of the invention, the reference speech patterns are reference word patterns and the subunit speech patterns are subword unit patterns such as those obtained for phonemes, allephones, demisyllables or other well known components of spoken words. In an embodiment illustrative of the invention, template signals representative of time frame sequences of acoustic feature signals of vocabulary words spoken by a first speaker are stored together with signals representative of the frame boundaries of syllable, demisyllable or other subunits of each spoken word. Another speaker's utterance of a vocabulary word is analyzed to form a frame sequence of acoustic features corresponding thereto. The acoustic feature signals of the other speaker are then transformed so that the number of frames is the same as the first speaker's speech pattern and a signal corresponding to the ratio of the other speaker's utterance length to the first speaker's utterance length is stored. The transformed acoustic feature sequence of the other speaker is dynamically time warped to the acoustic feature sequence of the first speaker and the frame locations of the other speaker's word subunit are determined responsive to the stored frame boundaries and the utterance length ratio signal. The frames of the other speaker's utterance of the word subunit are addressed and the acoustic feature signal sequence of the other speaker's subunit portion are determined for use in speech synthesizers and speech analyzers. Advantageously, there is no need to generate a separate phonetic transcription for each different speaker's utterance and match the phonetic transcription to the speech pattern.

DETAILED DESCRIPTION

Figure 1:
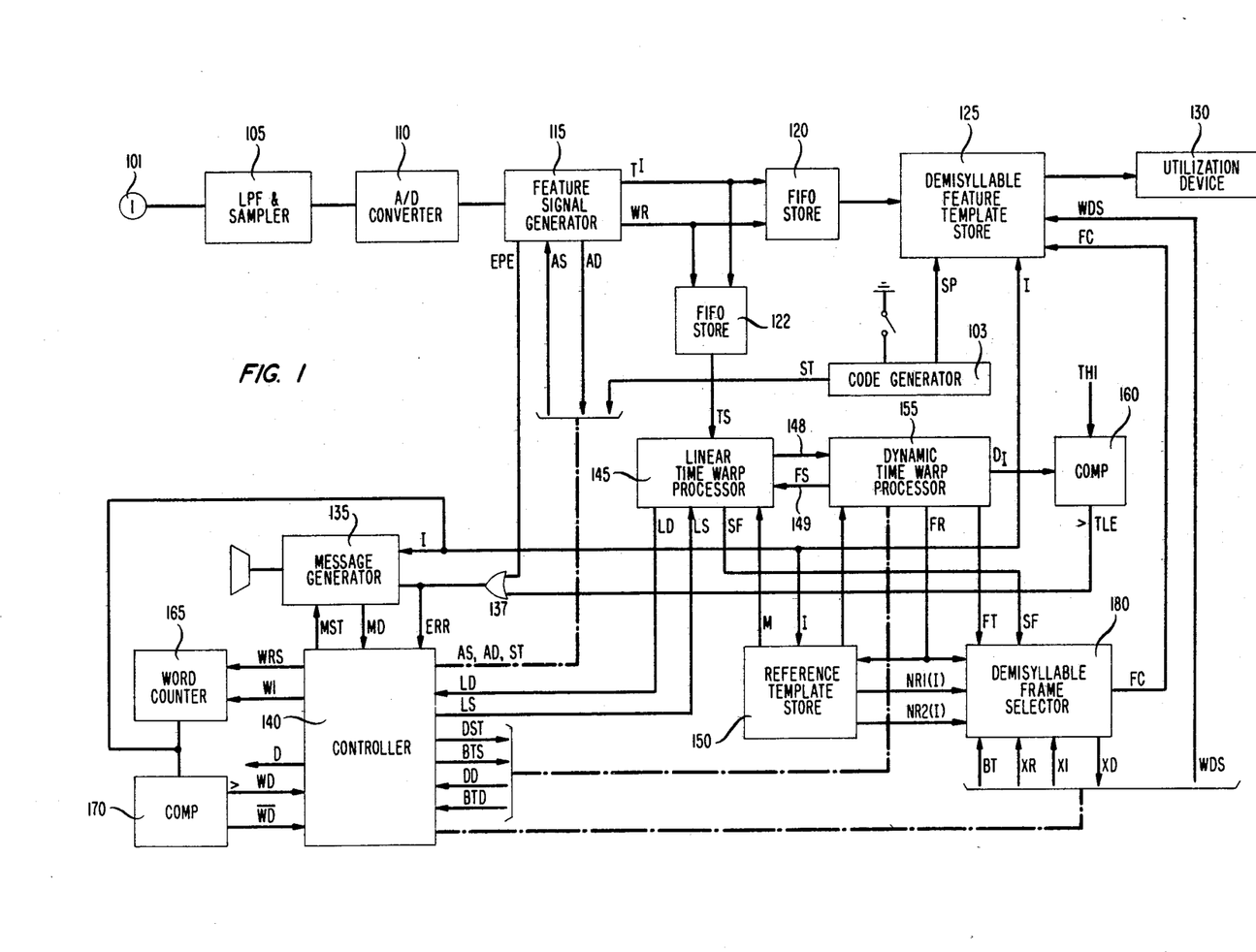
FIG. 1 depicts a block diagram of a speech pattern generator illustrative of the invention.

FIG. 1 depicts a block diagram of a subword unit speech pattern generator adapted to provide a set of subword unit templates for different speakers on the basis of a set of previously stored reference templates. It is to be understood that the stored reference templates may be phrases or messages and the subunits may be words or other message subunits. Store 150 contains a set of predetermined reference word templates previously derived by techniques well known in the art. Store 150 may comprise the INTEL 2716 2K×8 EPROM or similar device. Each template in store 150, e.g., $R^I$, contains a sequence of acoustic feature signals $$R^I = R^I(1), R^I(2), \ldots, R^I(m), \ldots, R^I(M_I) \qquad (1)$$

representative of the reference word as spoken by one or more speakers and signals corresponding to the boundary frames NR1(I) and NR2(I) of a prescribed subword unit portion, e.g., demisyllable of the reference word. For example, the phonetic reference word may be "back" and the prescribed subword unit portion may be the final demisyllable "ack". The boundary frame denote the location of the feature signals for the demisyllable "ack."

Figure 3:
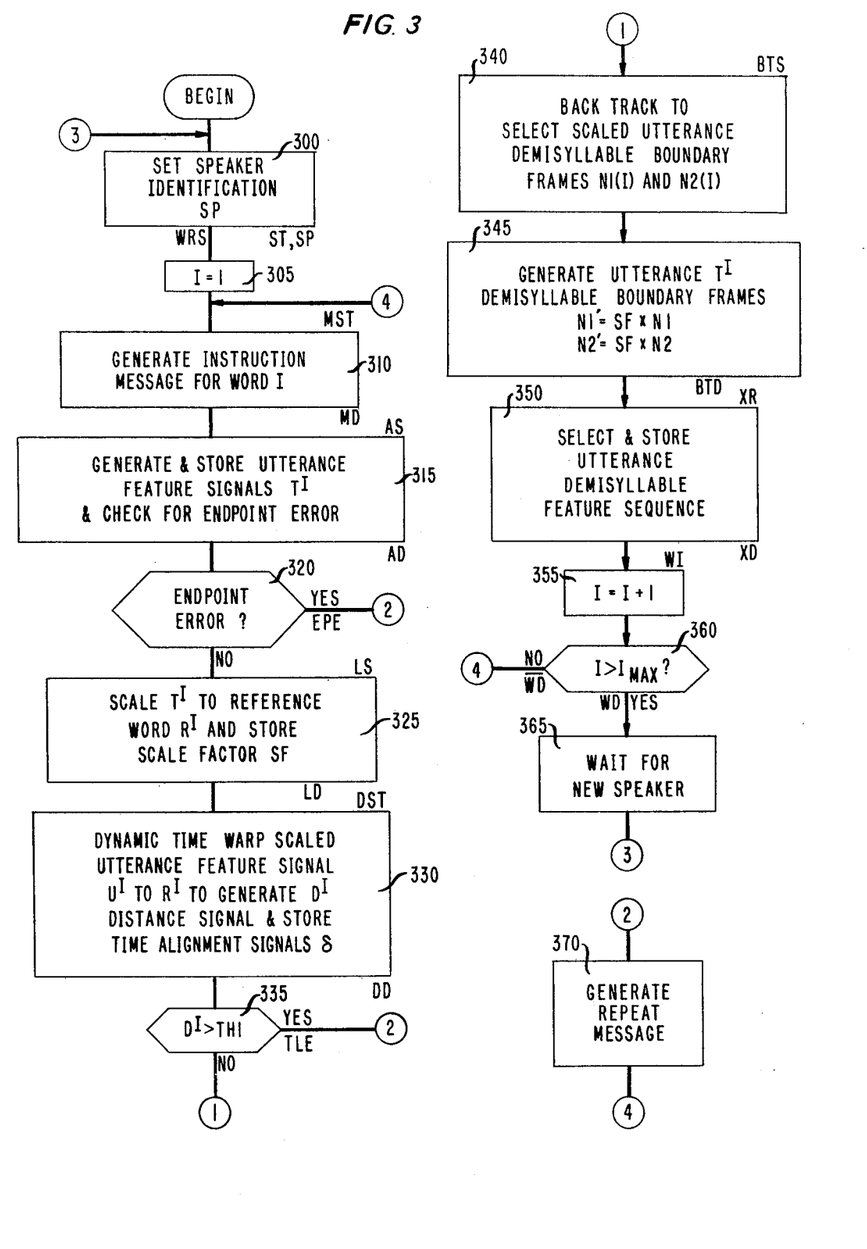
FIG. 3 shows a flow chart of a speech pattern generation process illustrative of the invention.

The flow chart of FIG. 3 illustrates the demisyllable speech pattern generating process. Initially, a speaker provides a start signal ST to controller 140 and a speaker identification signal SP to demisyllable template store 125 via code generator 103 as shown in operation box 300. The reference word identification signal I is set to 1 in word counter 165 as in index initialization box 305 and an instruction message requesting the speaker to input his utterance of reference word I is generated in message generator 135 as per operation box 310. the speaker's utterance is analyzed and a time frame sequence of utterance feature signals $$T^I = T^I(1), T^I(2), \ldots, T^I(N) \qquad 2)$$

is generated in feature signal generator 115 as per operation box 315. The length of the utterance is compared to a prescribed range to determine any endpoint errors in box 315. In the event the utterance duration is outside the prescribed range, control is transferred to operation box 370 via decision box 320 and a repeat utterance message is produced. The control operations are performed in controller 140. The utterance request for word I is then generated again in operation box 310 and the repeated utterance of word I is analyzed in box 315.

Referring to FIG. 1, an identified speaker SP for whom demisyllable templates are to be generated provides a momentary start signal ST to controller 140 via code generator 103 as well as an identification signal SP. Generator 103 may comprise a keyboard code generator well known in the art. Controller 140 may comprise a microprocessor arrangement such as described in the article "Let a Bipolar Processor Do Your Control and Take Advantage of Its High Speed" by Stephen Y. Lau appearing on pages 128–139 of *Electronic Design*, 4, February, 1979. The conroller is adapted in accordance with permanently stored instructions to provide the sequence of control signals shown on the right side thereof responsive to the control signal sequence applied thereto. The stored instructions for the operation of the controller are listed in FORTRAN language in Appendix A.

Responsive to the ST signal, controller 140 generates control pulses WRS (word counter reset) and MST (message start). The WRS pulse resets word counter 165 to its I=1 state so that the first reference template in store 150 is addressed. Counter 165 may be the type 74193 integrated circuit. The MST pulse is applied to message generator 135 which is operative as is well known in the art to produce a synthetic speech message instructing speaker SP to utter reference word I=1. Message generator 135 may comprise the National Semiconductor type DT1050 DIGITALKER TM Standard Vocabulary Kit. Upon completion of the instruction message, generator 135 supplies signal MD (message done) to controller 140 to indicate that the speaker's utterance is expected at microphone 101.

In response to signal MD, controller 140 generates control pulse AS. The AS pulse is applied to feature signal generator 115 to initiate its operation. The speech signal from microphone 101 is supplied to low-pass filter and sampler 105 which limits the bandwidth of the speech signal to the range, e.g., from 100 Hz to 3200 Hz, and periodically samples the bandlimited speech signal at, e.g., a 6667 Hz rate. Each successive speech signal sample is converted into a digitally coded signal in analog-to-digital converter 110 as is well known in the art.

Feature signal generator 115 receives the coded digital samples from converter 110 and produces the time sequence of linear predictive feature signals $T^I$ representative of the speech signal. Generator 115 also provides a WR (write) pulse for each successive feature signal frame to FIFO stores 120 and 122. Responsive to the sequence of WR pulses, the feature signals of $T^I$ are successively entered into First-in, First-out stores 120 and 122. Each of these FIFO stores may be the Signetics type 8×60 FIFO RAM controller.

Feature signal generator 115 may comprise the Linear Prediction Coefficient Generator described in U.S. Pat. No. 4,092,493 issued to L. R. Rabiner et al May 30, 1978 and also includes an endpoint detector such as disclosed in U.S. Pat. No. 3,909,532 issued to L. R. Rabiner et al Sept. 30, 1975 and assigned to the same assignee. The endpoint detector is adapted to detect the termination of the utterance applied to microphone 101. In the event an endpoint does not occur within a prescribed period of time, an EPE (endpoint error) signal is produced by generator 115. The EPE signal is supplied to message generator 135 via OR-gate 137. The ERR output of OR-gate 137 causes controller 140 to produce an MST signal which, in turn, initiates the generation of a repeat word message. After the MD (message done) signal is obtained from generator 135, controller 140 supplies an AS pulse to generator 115. The AS pulse initiates feature signal generation for the expected repeat utterance.

As is well known in the art, articulation and the rate of speech varies significantly from person to person. The stored reference word feature pattern $R^I$ has $M_I$ frames while the utterance feature pattern $I^I$ may have $N \neq M_I$ frames. In order to remove differences between the acoustic feature patterns caused by speech rate variation, the utterance feature signals are linearly scaled so that the utterance duration is changed to $M_I$ frames as per operation box 325 of FIG. 3. The scale factor $N/M_I$ is retained to permit inverse scaling at a later time. The modified utterance pattern $U^I$ is an $M_I$ frame pattern. The articulation differences, however, result in a nonlinear relationship between the modified utterance feature signal sequence $U^I$ and the reference word feature sequence $R^I$.

In order to determine the relationship between the modified utterance pattern frames and reference word pattern frames, the modified utterance feature signal sequence is dynamically time warped to the reference word feature sequence in operation box 330. A signal representative of the best correspondence between the reference word and the input utterance feature signal patterns and a set of signals $\delta$ representative of the sequence of utterance frames best corresponding to reference word frames are produced by the dynamic time warping. The correspondence signal is compared to a predetermined threshold TH1 in decision box 335. If the modified utterance and reference word patterns are not sufficiently similar, box 370 is entered and the utterance is repeated as previously described.

Referring to FIG. 1, generator 115 supplies an AD pulse to controller 140 upon termination of the feature signal generation for the utterance of word I. At this time, each of stores 120 and 122 contains the set of feature signals $T^I$ for the applied utterance. Linear time warp processor 145 which may comprise the circuit disclosed in U.S. Pat. No. 4,020,332 issued to R. E. Crochiere et al Apr. 26, 1977 and assigned to the same assignee is adapted to modify the feature signals from store 122 so that the utterance feature signals occupy the same time interval as the stored reference feature signals for the same word in reference template store 150. In effect, the number of frames of the applied utterance (N) is changed to the number of frames ($M_I$) of the reference template for the word in store 150. A signal SF corresponding to the scale factor $N/M_I$ is produced and stored in processor 145.

Upon termination of the feature signal generation in generator 115, control pulse AD is applied from generator 115 to controller 140. Responsive to the AD pulse, controller 140 supplies control pulse LS to linear time warp processor 145 whereby the linear time warp operation is initiated. Processor 145 receives the sequence of feature signals from FIFO store 122 and is operative to modify these feature signals so that the sequence of $M_I$ frame modified feature signals $$U^I = U^I(1), U^I(2), \ldots U^I(j), \ldots U^I(M_I) \qquad (3)$$

are produced. The modified utterance feature signals are stored in a frame addressable memory in processor 145.

The time alignment between the modified utterance speech pattern and the stored reference word speech pattern must be determined to account for the differences in articulation between the reference word $R^I$ and the modified utterance $U^I$. As is well known in the art, the modified utterance feature signals may be time warped to the reference feature signals to form the best matching correspondence signal $$D^I(R^I, U^I) = \frac{1}{M_I} \min_{w(i)} \sum_{i=1}^{M_I} d(R^I(i), U^I(w(i))) \qquad (4)$$

where $w(i)$ is the optimal time warping factor between feature vectors $U^I$ and $R^I$ and $$\hat{d}(i,j) = d(R^I(i), U^I(j)) = \log(R^I(i) \cdot U^I(j)). \qquad (5)$$

$\hat{d}(i,j)$ is the local distance between the feature vectors of frame i of modified utterance features $U^I$ and the frame $j = w(i)$ of the stored reference features $R^I$. $w(i)$ is usually restricted so that the slope of warping factor $w(i)$ corresponds to the range of expected speech pattern frames. After the process of Equation 4 is completed, $D^I(R^I, U^I)$ represents the best similarity between the modified utterance features and the reference word features and the warping factor $w(i)$ corresponds to the time alignment path between the modified utterance features and the reference features of Equation 4.

In the dynamic time warping process, the possible time alignment paths between the stored reference features and the modified utterance features are mapped through points (i,j) in accordance with $$D_A(i,j) = d(i,j) + \min [D_A(i-1, k)] \qquad (6)$$
$$j - I_2 \leq k \leq j - I_1$$

$1 \leq i \leq M_I$ are the reference word feature frames; $1 \leq j \leq M_I$ are the modified utterance feature frames and $D_A(i,j)$ is the accumulated distance signal for a path from point (1,1) to point (i,j). $\hat{d}(i,j)$ is the local distance (Equation 5) between the modified utterance feature vectors at modified utterance feature frame j and the reference word feature vectors at reference word feature frame i.

The rightmost term in Equation 6 represents the accumulated distance up to reference word frame $i-1$ and modified utterance frame $j-I_2 \leq k \leq j-I_1$. Frame $I_1$ is chosen to conform to the allowable articulation differences. It is usually set at 1 if $w(i-1)=w(i-2)$ and is set to zero otherwise. $I_2$ is typically set to 2. Thus k extends over the range from $j-2$ to $j-1$ if $w(i-1)=w(i-2)$ and extends over the range from $j-2$ to $j$ otherwise. Dynamic time warping arrangements are described in greater detail in the article "Minimum Predication Residual Principle Applied to Speech Recognition" by F. Itakura, *IEEE Transactions on Acoustics, Speech and Speech Processing*, Vol. ASSP-23, pp. 67-72, February 1975 and the article "Considerations in Dynamic Time Warping Algorithms for Discrete Word Recognition" by L. R. Rabiner, A. E. Rosenberg and S. E. Levinson, *IEEE Transactions on Acoustics, Speech and Signal Processing*, Vol. ASSP-26, pp. 575-582, December 1978.

In the circuit of FIG. 1, dynamic time warp processor 155 is adapted to generate an overall distance signal $D^I$ in accordance with Equation 4. As aforementioned, signal $D^I$ is a measure of the best similarity between the modified utterance features $U^I$ and the reference word features for reference word $R^I$. A set of time alignment signals indicative of the time warping path w(i) between the best corresponding feature signals $U^I(j)$ and $R^I(i)$ is also produced.

DTW processor 155 may comprise an arrangement such as described in the *Microproducts Hardware System* reference published by Data General Corporation, Westboro, Mass., and copyrighted by Data General Corporation, 1979, or other processor systems well known in the art. Processor 155 may include the Micro-NOVA MP 100 system processing unit, the MP 1100 4K/8K dynamic random access memory, the MP/100 8K programmable read only memory and one or more model 422 digital I/O interface units. The operation sequence of the processor is determined by the permanently stored instructions in the read-only memory thereof. These instructions are listed in FORTRAN language form in Appendix B. Processor 155 operating in accordance with the permanently stored instructions of Appendix B performs the dynamic time warping operation of Equation 6 for each reference word frame i. The selection of reference word frames for the time alignment is performed in accordance with Equation 6.

Upon termination of the utterance feature scaling in processor 145, Control pulse LD causes controller 140 to change state and to supply signal DST to processor 145. The DST signal initiates the dynamic time warp processing for the sequence of feature signal time frames. At each reference word frame i, the reference word feature signal $R^I(i)$ is transferred from template store 150 to processor 155. A sequence of selected modified utterance frames j within the range of frames from $$L(j) = max[\tfrac{1}{2}(j-1), M_I - 2(M_I - j), 1]$$

$$H(J) = min[2(j-1)+1, M_I - \tfrac{1}{2}(M_I - j), M_I] \quad (7)$$

is addressed and the feature signals $U^I(j)$ are supplied to processor 155. The cumulative distance signals $D_A$ for the range of Equation 7 are generated in processor 155 and a signal $\delta = i - k$ representative of the displacement between $w(i-1)$ and $w(i)$ is produced and stored for each (i,j) point. At the last reference word frame $M_I$, the minimum cumulative distance signal $D_I$ is selected and applied to comparator 160.

Comparator 160 produces a TLE signal if the selected distance signal $D_I$ exceeds a predetermined threshold value. In this event, there is not sufficient similarity between the stored reference word pattern and the modified utterance pattern to determine the frame interval for the prescribed demisyllable in the modified utterance pattern. Consequently, a new input utterance of the word I must be requested. Signal TLE causes OR-gate 137 to produce conrol signal ERR which control signal activates message generator 135 as previously described. Message generator 135 is then rendered operative to synthesize a repeat utterance message and an utterance of I message. Controller 140 then supplies control pulse AS to feature signal generator 115 to initiate an analysis of the new utterance.

Where the distance signal $D_I$ from processor 155 does not exceed the threshold TH1, control pulse DD from processor 155 in FIG. 1 causes controller 140 to generate a BTS pulse and a BT control signal. The BTS pulse is applied to dynamic time warping processor 155 and the back-track operation indicated in operation box 340 of FIG. 3 is initiated in the processor. While processor 155 is in its back-track mode, the sequence of reference word frames are generated in reverse order. The reference word frame signals, $m = M_I, M_I - 1, \ldots, i, \ldots 2, 1$ are output from the processor as coded signals $F_R$. When the reference word frame $i = M_I$ is addressed, the corresponding frame $F_S = M_I$ of the modified utterance is produced. At reference frame $M_I - 1$ the corresponding utterance frame is $M_I - \delta(M_I)$. The processing proceeds for each reference word frame j and the modified utterance frame $$j = w(i+1) - \delta(i+1) \quad 8)$$

appears as signal Fs. The back-tracking operations of processor 155 are controlled by stored instructions listed in FORTRAN language in Appendix B.

Figure 2:
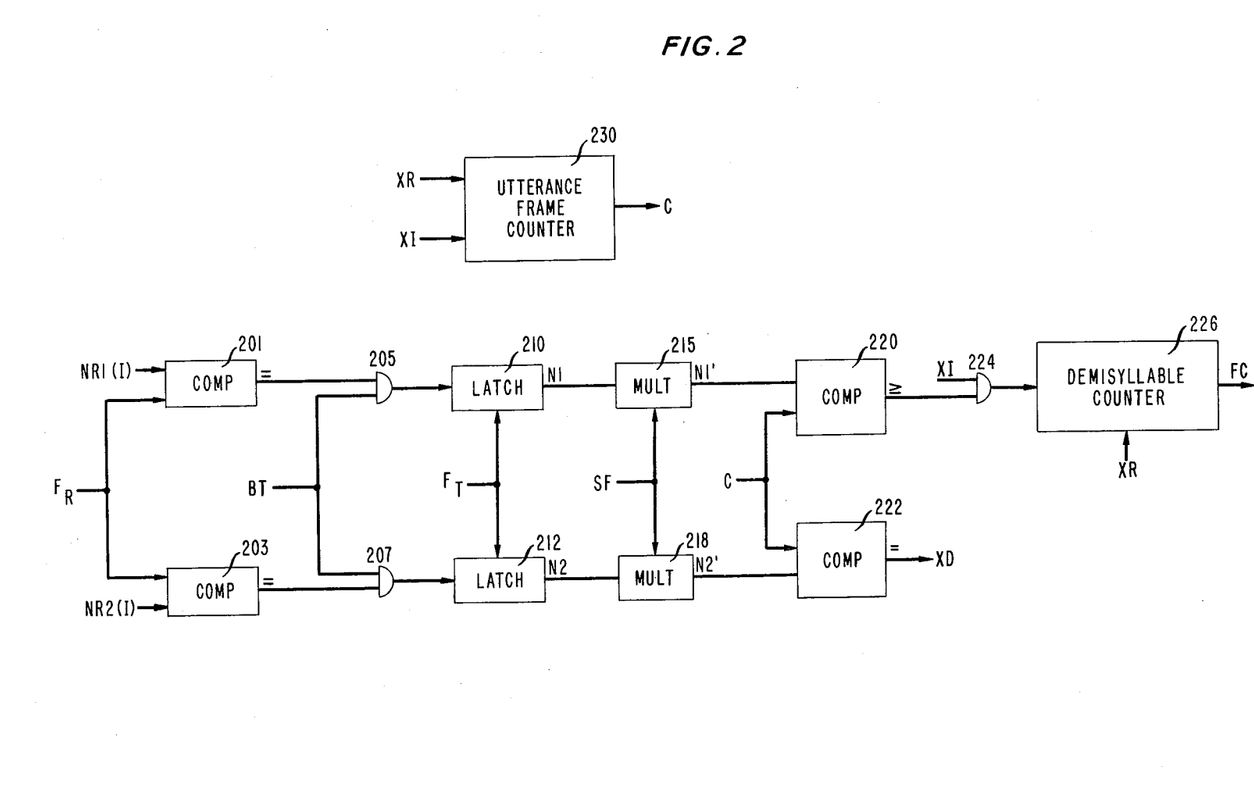
FIG. 2 shows a detailed block diagram of the demisyllable segment selector of the circuit of FIG. 1.

As the backtracking proceeds, the demisyllable portion of the modified utterance is selected in demisyllable frame selector 180 shown in greater detail in FIG. 2. For each reference word I in store 150, the signals representative of the demisyllable portion of the reference word are available from the store. In the circuit of FIG. 1, a signal corresponding to the beginning frame of the prescribed demisyllable portion, NR1(I), is supplied to one input of comparator 102 in selector 180 from store 150. A signal corresponding to the endframe of the demisyllable portion, NR2(I), is applied to one input of comparator 203 in selector 180 from store 150. Each of comparators 201 and 203 may comprise one or more of the type 7485 integrated circuit.

The sequence of reference frames $F_R$ from processor 155 during the back-track operation is applied to both comparators 201 and 203. When reference word frame signal $F_R$ equals demisyllable endpoint frame signal NR2(I), the output of comparator 203 is enabled at the time that the corresponding modified utterance frame from processor 155, $F_S$, is applied to latch 212. AND-gate 207 turns on jointly responsive to control signal BT and the enabled output of comparator 203 whereby the modified utterance frame coresponding to the reference word demisyllable endframe is inserted into latch 212. Latch 212 and each of the other latches in FIG. 2 may comprise one or more of the type 74273 integrated circuit.

The sequencing of reference word frames in processor 155 continues. When frame signal $F_R$ equals beginning frame signal NR1(I), the corresponding frame $F_S$ for the modified utterance is placed in latch 210 responsive to the enabled output of comparator 201. Processor 155 continues to perform the back-track operation until reference frame signal $F_R=1$. At that time, processor 155 produces control pulse BTD which indicates the termination of the back-track operation.

Latch 210 now contains the modified utterance frame N1 corresponding to the beginning frame of the prescribed demisyllable and latch 212 contains modified utterance frame signal N2 corresponding to the endframe of the prescribed demisyllable in the modified utterance. The modified utterance, however, was the result of scaling in linear time warped processor 145 which equalized the durations of the utterance and the reference word. During the scaling operation, signal SF representative of the ratio of the modified utterance duration N to the input utterance duration $M_I$ was produced.

The N1 signal in latch 210 is now applied to one input of multiplier 215 and the scaling factor SF is appied to the other input thereof. Multiplier 215 is operative to form signal N1' which represents the beginning frame of the prescribed demisyllable in the original utterance. Similarly the N2 signal from latch 212 is multiplied by scale factor SF in multiplier 218 to produce a signal N2' representative of the endframe of the prescribed demisyllable in the original utterance. Thus, the prescribed demisyllable portion of the original utterance is determined as the interval between frames N1' and N2' (operation box 345 of FIG. 3). Each of multipliers 213 and 215 may be the TRW MPY-16HJ integrated circuit.

At the end of the back-track operation of operation boxes 340 and 345 in FIG. 3, the boundary frames of the demisyllable portion of the utterance are available at the outputs of multipliers 215 and 213. The utterance acoustic feature signal sequence is stored in FIFO store 120. As indicated in operation box 350 of FIG. 3, the prescribed demisyllable portion of the utterance is selected and stored in demisyllable store 125 responsive to signals N1' and N2'. Store 125 may be the Mostek type MK4802 2k×8 RAM circuit.

Control pulse BTD is applied to controller 140 when the back-track operation is terminated. Responsive to pulse BTD, controller 140 changes state and produces control pulse XR and control signal WDS. The XR pulse resets both demisyllable frame counter 226 and utterance frame counter 230 to their first states. These counters may comprise one or more of the 74193 integrated circuit. The WDS signal is applied to the write enable input of demisyllable feature template store 125 to permit the storage therein of the utterance feature signals from FIFO store 120.

At this time, the $F_S=1$ frame of the $I^{th}$ word for identified speaker SP is addressed in template store 125. Controller 140 generates a sequence of XI pulses which successively increment counter 230. The C output of counter 230 representative of the successive utterance frames is supplied to one input of comparator 220 and to one input of comparator 222. The output of multiplier 215 representative of the prescribed demisyllable beginning frame N1' is applied to the other input of comparator 220. Until utterance frame signal C from counter 230 is equal to frame signal N1' from multiplier 215, the output of comparator 220 is disabled and the FC frame output of demisyllable counter 226 remains unaltered. Consequently, the succession of feature signals from FIFO store 120 are loaded into the first frame position of reference word I in demisyllable feature template store 125.

When the C output of utterance frame counter 230 is equal to the demisyllable begin frame signal from multiplier 215, comparator 220 is enabled and subsequent XI count pulses increment demisyllable counter 226 via AND-gate 224. The utterance feature signals for the prescribed demisyllable begin frame N1' are stored in the FC=1 location for reference word I in template store 125. Comparator 220 remains enabled so that demisyllable counter 226 is successively incremented. In this way, the sequence of utterance feature signals for the prescribed demisyllable is placed in the successive locations of template store 125.

Comparator 222 is enabled when the output of utterance frame counter 230 is equal to the N2' endframe of the prescribed demisyllable. The XD signal from comparator 222 occurring at the prescribed demisyllable endframe is supplied to controller 140. The controller is operative to end the generation of XI counter increment pulses. Thus, after all the utterance feature signals in the prescribed demisyllable are stored in template store 125 the operation of demisyllable frame selector 180 is terminated.

Controller 140 supplies control pulse WI to word counter 165 responsive to control pulse XD. The WI pulse increments word counter 165 as per index box 355 in FIG. 3 so that the next reference word template in store 150 is addressed. Comparator 170 is enabled if the word count output I is greater than the last word count IMAX (decision box 360). In this event, signal WD is obtained which places the circuit of FIG. 1 in a wait mode (operation box 365) until an ST (start) signal is received from input circuit 103. Where I does not correspond to the last reference word, signal $\overline{WD}$ is obtained from comparator 170. The $\overline{WD}$ signal causes controller 140 to generate signal MST so that an utterance request for the next reference word is produced by message generator 135. After the subword unit patterns are stored in template store 125, they are transferred to utilization device 130 such as a speech recognizer or a speech synthesizer for use therein. The utilization device may, of course, be any speech processing apparatus in which speech pattern templates are used. Alternatively, the templates may be stored in a read only memory that may be incorporated in speech processing equipment.

The invention has been described with reference to a particular embodiment thereof. It is to be understood, however, that various changes in form and detail may be made by those skilled in the art without departing from the spirit and scope of the invention. For example, the reference speech patterns may correspond to a continuous pattern of concatenated words and the subunit speech patterns may correspond to individual words.

APPENDIX A

```
C    CONTROLLER (140)
C    BIT ASSIGNMENTS FOR DEVICE I/O
C    WAIT CODES (IN OCTAL)
     PARAMETER ST=01K, MD=02K, AD=04K
     PARAMETER LD=010K, DD=020K; BTD=040K
C    OUTPUT CODES
     PARAMETER WRS=01K, MST=02K, AS=04K
     PARAMETER LS=010K, DST=020K, BT=040K
     PARAMETER BTS=0100K, XR=0200K, XI=0400K
     PARAMETER WDS=01000K, WI=02000K
C    INPUT CODES
```

APPENDIX A-continued

```
            PARAMETER ERR=01K, XD=02K, WD=04K
            CALL IOINIT
10          CONTINUE
C           WAIT FOR START SIGNAL (ST)
            CALL WAIT (ST)
C           INITIALIZE WORD COUNTER (305)
            CALL OUTPUT (WRS)
100         CONTINUE
C           SEND MESSAGE (310)
            CALL OUTPUT (MST)
            CALL WAIT (MD)
C           ACCEPT TEST UTTERANCE (315)
            CALL OUTPUT (AS)
            CALL WAIT (AD)
            CALL INPUT (IV,ERR)
            IF (IV. EQ. 1) GO TO 900
C           LINEAR TIME WARP (325)
            CALL OUTPUT (LS)
            CALL WAIT (LD)
C           RUN FIRST PHASE OF DTW (330)
            CALL OUTPUT (DST)
            CALL WAIT (DD)
            CALL INPUT (IV,ERR)
            IF (IV. EQ. 1) GO TO 900
C           RUN BACKTRACK (PHASE 2 OF DIW) (340)
            CALL OUTPUT (BT + BTS)
            CALL WAIT (BTD)
            CALL OUTPUT (O)
C           FRAME SELECTOR 160 GENERATES N1 PRIME
C           AND N2 PRIME IN HARDWARE (345)
C           TRANSFER FEATURE DATA FROM FIFO 120
C           TO FEATURE TEMPLATE STORE 125 (350)
            CALL OUTPUT (XR)
200         CONTINUE
            CALL OUTPUT (XI + WDS)
            CALL INPUT (IV,XD)
            IF (IV. NE. 1) GO TO 200
C           INCREMENT WORD COUNTER (335-360)
            CALL OUTPUT (WI)
            CALL INPUT (IV,WD)
            IF (IV. NE. 1) GO TO 100
C           DONE - WAIT FOR NEXT SPEAKER (365)
            GO TO 10
C           OUTPUT ERROR MESSAGE (370)
900         CONTINUE
            CALL OUTPUT (MST)
            CALL WAIT (MD)
            GO TO 100
            END
; DATA GENERAL MP/OS (AOS) DEVICE LEVEL ROUTINES
.TITLE DIO
.NREL
DC=66 ; DEVICE CODE FOR I/O INTERFACE
; CALL IOINIT
; MAKE THIS CALL BEFORE FIRST I/O CALL
DEFARGS
DEFTMPS
FENTRY  IOINIT
STA  3,AC3SV
LDA  0,=DC
? DEBL   ; ENABLE DEVICE I/O
WAIT
LDA 3,AC3SV
FRET
AC3SV:0
; CALL WAIT (IWC)
; WAIT FOR BIT FLAG TO BE 1
DEFARGS
DEF IWC
DEFTMPS
FENTRY  WAIT
LDA  0, @ IWC,3  ; GET WAIT CODE
LP: DIA  1,DC    ; GET FLAG WORD
AND  0,1,SNZ   ; LOOP UNTIL FLAG SET
JMP LP
FRET
; CALL OUTPUT (IWD)
; OUTPUT DATA WORD
DEFARGS
DEF IWD
DEFTMPS
FENTRY  OUTPUT
```

APPENDIX A-continued

```
LDA 0, @ IWD,3  ; GET USER DATA
DOB 0, DC  ; OUTPUT WORD
FRET
; CALL INPUT (IWD, IMSK)
; INPUT DATA WORD (MASKED)
DEFARGS
DEF IWD
DEF IMSK
DEFTMPS
FENTRY  INPUT
DIB 1, DC  ; GET DATA
LDA 0, @ IMSK  ; MASK OFF
AND 0, 1
STA 1, @ IWD  ; RETURN TO USER
FRET
.END
```

APPENDIX B

```
C     DYNAMIC TIME WARP PROCESSOR (155)
C     TWO PHASE TIME WARP PROCESSOR
C     WARP PHASE INITIATED BY SIGNAL DST (START)
C     OUTPUTS FRAME COUNT SIGNAL FSUBR FOR
C     REFERENCE AND FSUBS FOR TEST
C     ACCEPTS FRAME VECTORS RSUPI OF
C     REFERENCE AND USUPI OF TEST.
C     AT END OF WARP PHASE OUTPUTS DSUBA AS
C     WARP DISTANCE AND SIGNAL DD (DONE).
C     BACK TRACK PHASE INITIATED BY SIGNAL BTS
C     (START).
C     OUTPUTS FRAME COUNT SIGNALS FSUBR AND
C     FSUBS (AS BEFORE) AND SIGNAL FT
C     FOR EACH FRAME (CLOCK SIGNAL FOR
      DEMISYLLABLE
C     FRAME SELECTOR 180). AT END OF BACKTRACK
C     PHASE OUTPUTS SIGNAL BTD (DONE).
C
C     ASSUMES REFERENCE AND TEST ARE OF
C     SAME LENGTH - (INPUT AS M).
C     DTW - WARP ROUTINE
C
C     M= LENGTH IN FRAMES OF TEST AND REFERENCE
      UTTERANCE
C     FT = PATH WHICH WILL DETERMINE MINIMUM
      DISTANCE
C
      DIMENSION FT(40)
      DIMENSION D(100),DCU(100)
      DOUBLE PRECISION DELTA (100),VPI,XMLT,VPIM1
      INTEGER DL/0/
      DATA XLRG/1000./
C     BIT ASSIGNMENTS FOR DEVICE I/O
C     WAIT CODES (IN OCTAL)
      PARAMETER DST=01K, BTS=02K
C     OUTPUT CODES
      PARAMETER DD=01K, BTD=02K, FT=04K
C     BALANCE OF I/O DONE BY WORD
C     DSUBA, FSUBR, FSUBS (OUTPUTS)
C     RSUPI, USUPI (INPUTS).
      DATA K/2/
      CALL IOINIT
      IMAX(I)=MINO(K*(I-1)+1+DL, (I-M)/K+M+DL,M)
      IMIN(I)=MAXO((I-1)/K+1-DL,K*(I-M)+M-DL,1)
999   DSUBA=0.
C
      CALL WAIT (DST)
C
      DO 1I=1,40
1     FT(I)=0
      FSUBR1=IMIN(1)
      FSUBR2=IMAX(1)
      DELTA (1)=0.
      XMLT=1.
      XMND=1000.
      DO 60 FSUBR=FSUBR1,FSUBR2
      CALL DIST(FSUBR,1,DCU(FSUBR))
      IF(DCU(FSUBR).LT.XMND) XMND=DCU(FSUBR)
      DELTA (1)=DELTA(1)+XMLT
      XMLT=XMLT*3D0
60    CONTINUE
      DO 65 FSUBR=FSUBR2+1,M
```

APPENDIX B-continued

```
        DCU(FSUBR)=XLRG
 65  CONTINUE
        DO 200 FSUBS=2,M
        XMND=XLRG
        FSUBR1P=FSUBR1
        FSUBR2P=FSUBR2
        FSUBR1=IMIN(FSUBS)
        FSUBR2=IMAX(FSUBS)
        D1=XLRG
        D2=XLRG
        IF(FSUBR1-1.GE.FSUBR1P)D1=DCU(FSUBR1-1)
        IF(FSUBR1-2.GE.FSUBR1P)D2=DCU(FSUBR1-2)
        DO 30 FSUBR=FSUBR1,FSUBR2
        CALL DIST(FSUBR,FSUBS,D(FSUBR))
 30  CONTINUE
        DELTA (FSUBS)=0.
        XMLT=1.
        IMP=FSUBR1-FSUBR1P
        VPIM1=DELTA(FSUBS-1)
        IF(IMP.EQ.0)GO TO 56
        DO 55 IM=1,IMP
        VPIM1=VPM1/3D0
 55  CONTINUE
 56  CONTINUE
        DO 100 FSUBR=FSUBR1,FSUBR2
        DO=DCU(FSUBR)
        DI=D1
        LPTH=2
        IF(D1-D2)10,11,11
 10     LPTH=1
        DI=D1
 11  IF (DO-DI)12,12,20
 12  CONTINUE
        IF(FSUBR.GT.FSUBR2P)GO TO 20
        KVPM=DMOD(VPIM1,3D0)
        IF(KVPM.EQ.0)GO TO 20
        LPTH=0
        DI=DO
 20  CONTINUE
        VPIM1=VPIM1/3D0
        DI=DI+D(FSUBR)
        IF(XMND-DI)50,50,51
 51     XMND=DI
        FSUBRMN=FSUBR
 50  CONTINUE
        D2=D1
        D1=DO
        DCU(FSUBR)=DI
        DELTA (FSUBS)=DELTA
        (FSUBS)+DFLOAT(LPTH)*XMLT
        XMLT=XMLT*3D0
 100 CONTINUE
 90  CONTINUE
        IF(FSUBR1.LE.FSUBR1P)GO TO 92
        DO 91 FSUBR=FSUBR1P,FSUBR1-1
        DCU(FSUBR)=XLRG
 91  CONTINUE
        IF(FSUBR2.GE.FSUBR2P)GO TO 93
        DO 92 FSUBR=FSUBR2+1,FSUBR2P
        DCU(FSUBR)=XLRG
 92  CONTINUE
 93  CONTINUE
 200 CONTINUE
        XSAV=XSAV/FLOAT(NCB)*FLOAT(M)
        DSUBA=XMND
        IF(XSAV.LT.DSUBA) DSUBA=XSAV
C
C    DO BACKTRACKING
C
        CALL OTD (DSUBA)
        CALL OUTPUT (DD)
        CALL WAIT (BTS)
C
        FT(M)=M
        IMN=FSUBR
        DO 250 FSUBS=M,2,-1
        VPI=DELTA (FSUBS)
        IMP=IMN-IMIN(FSUBS)
        IF(IMP.EQ.0) GO TO 251
        DO 252 IM=1,IMP
        VPI=VPI/3D0
 252 CONTINUE
 251 CONTINUE
        KVP=DMOD(VPI,3D0)
        FT(FSUBS-1)=FT(FSUBS)-KVP
 250 IMN=IMN-KVP
C
C    OUTPUT PATH INFORMATION
C
        CALL OTFR (FSUBR)
        CALL OTFS (FSUBS)
        CALL OUTPUT (FT)
        CALL OUTPUT (BTD)
C
C    LOOP BACK TO BEGINNING
C
        GO TO 999
        END
C    DIST--DISTANCE ROUTINE USING
C    AUTOCORRELATION OF A'S
        SUBROUTINE DIST(IR,IT,DST)
        COMMON CR(9,40),CT(9,40)
        PARAMETER M=8,ME=M+1
C
C    CI=TEST ARRAY
C    M=8,ME=9
C    CR=NORMALIZED CORRELATION FUNCTION
C    OF A'S OF REFERENCE FRAME
C    CR(I)=2*COR(I)/COR(0)WHERE COR
C    IS TRUE CORRELATION OF A'S
C    RC=CR(1,IR)
C    TC=LOG RESIDUAL ERROR OF TEST FRAME
C    TC=CT(1,IT)
C
C    DST=RC+LOG(ACOR DOT P)-TC
C    FORM R DOT T AND STORE IN PR1
C    OUTPUT(FN=IT) ;READ IN FROM UTTERANCE
C    FEATURE SIGNAL STORE
        CALL OTFR (FSUBR)
        CALL OTFS (FSUBS)
        CALL INR (RSUPI)
        CALL INU (USUPI)
        RC=CR(1,IR)
        PR1=0.
        DO 5 I=2,M+1
  5     PR1=PR1+CR(I,IR)*CT(I,IT)
        TC=CT(1,IT)
        PR1=PR1+1.
        IF(PR1.LT.E-5) PR1=1.E-5
        DST=ALOG(PR1)+RC-TC
        RETURN
        END
; DATA GENERAL MP/OS (AOS) DEVICE LEVEL ROUTINES
.TITLE DIO
.NREL
DC=66 ; DEVICE CODE FOR I/O INTERFACE
; CALL IOINIT
; MAKE THIS CALL BEFORE FIRST I/O CALL
DEFARGS
DEFTMPS
FENTRY  IOINIT
        STA   3,AC3SV
        LDA   0,=DC
        ? DEBL  ; ENABLE DEVICE I/O
        WAIT
        LDA   3,AC3SV
        FRET
AC3SV:0
; CALL WAIT (IWC)
; WAIT FOR BIT FLAG TO BE 1
DEFARGS
DEF IWC
DEFTMPS
FENTRY  WAIT
        LDA 0, @ IWC,3  ; GET WAIT CODE
LP:  DIA 1,DC  ; GET FLAG WORD
        AND 0,1,SNZ  ; LOOP UNTIL FLAG SET
        JMP LP
        FRET
; CALL OUTPUT (IWD)
; OUTPUT DATA WORD
DEFARGS
DEF IWD
DEFTMPS
```

APPENDIX B-continued

```
FENTRY   OUTPUT
         LDA 0, @ IWD,3   ; GET USER DATA
         DOB 0, DC        ; OUTPUT WORD
         FRET
         ; CALL INPUT (IWD, IMSK)
         ; INPUT DATA WORD (MASKED)
         DEFARGS
         DEF IWD
         DEF IMSK
         DEFTMPS
FENTRY   INPUT
         DIB 1, DC        ; GET DATA
         LDA 0, @ IMSK    ; MASK OFF
         AND 0, 1
         STA 1, @ IWD     ; RETURN TO USER
         FRET
         .END
; DATA GENERAL MP/OS (AOS) DEVICE LEVEL ROUTINES
; EXTENDED ROUTINES FOR WORD I/O
         .TITLE WID
         .NREL
         DC=67  ; DEVICE CODE FOR WORD I/O
         DEFARGS
                 DEF IWD
         DEFTMPS
         FENTRY  OTD
                 LDA 0,@ IWD, 3 ; OUTPUT DSUBA
                 DOA 0, DC
                 FRET
         FENTRY  OTFR
                 LDA 0,@ IWD,3 ; OUTPUT FSUBR
                 DOB 0, DC
                 FRET
         FENTRY  OTFS
                 LDA 0, @ IWD,3 ; OUTPUT FSUBS
                 DOC 0,DC
                 FRET
         DEFARGS
                 DEF IWD
         DEFTMPS
         FENTRY  INR
                 DIA 0, DC ; INPUT RSUPS
                 STA 0,@ IWD,3
                 FRET
         FENTRY  INU
                 DIA 0,DC ; INPUT USUPI
                 STA 0,@IWD,3
                 FRET
                 .END
```

What is claimed is:

1. A method for producing subunit speech patterns comprising the steps of:

storing a plurality of reference speech pattern templates each comprising a time frame sequence of acoustic feature signals representative of a prescribed spoken reference speech pattern; storing a set of signals each representative of the time of occurrence of at least one predetermined subunit in the reference acoustic feature signal sequence for each reference speech pattern; analyzing an utterance of one of said stored reference speech patterns to generate a time frame sequence of acoustic feature signals representative of the utterance; generating signals representative of the time alignment of said utterance feature signal sequence and said stored reference speech pattern feature signal sequence; and determining the sequence of utterance feature signals corresponding to the predetermined subunit in said stored reference speech pattern template responsive to the time alignment signals and said reference subunit time of occurrence representative signals.

2. A method for producing subunit speech patterns according to claim 1 wherein said subunit time of occurrence signal storing step comprises storing a first signal representative of the time frame of the reference speech pattern template at which said subunit begins and storing a second signal representative of the time frame at which said subunit terminates; and said determining step comprises detecting a first time frame of the utterance corresponding to said first signal and a second time frame of the utterance corresponding to said second signal, and storing the utterance feature signals from said first time frame and to said second time frame.

3. A method for producing subunit speech patterns according to claim 2 wherein said time aligning step comprises modifying said utterance feature signals to match the number of time frames in said utterance to the number of time frames in said stored reference speech pattern jointly responsive to the utterance feature signals and the stored reference speech pattern feature signals.

4. A method for producing subword speech patterns according to claim 3 wherein said time aligning step further comprises producing a set of signals representative of the best matching time frame path between said utterance feature signals and reference speech pattern feature signals jointly responsive to the modified utterance feature signals and the reference speech pattern feature signals.

5. A method for producing subunit speech patterns according to claim 4 wherein said utterance time frame detecting step comprises comparing said first signal to the sequence of reference speech pattern time frames to generate a subunit begin frame signal, comparing said second signal to the sequence of reference speech pattern time frames to generate a subunit endframe signal, producing a signal representative of the utterance time frame corresponding to the reference speech pattern subunit begin frame responsive to said reference speech pattern subunit begin frame signal and said best matching time frame path signals, and producing a signal representative of the utterance time frame corresponding to the reference speech pattern subunit endframe responsive to said reference speech pattern subunit endframe signal and said best matching time frame path signals.

6. A method for producing subunit speech patterns according to claim 5 wherein the step of producing an utterance time frame signal corresponding to the reference speech pattern subunit endframe comprises determining the time of occurrence of the reference speech pattern subunit endframe in the sequence of reference speech pattern time frames responsive to said second signal, and selecting the utterance time frame corresponding to the best time alignment at said time of occurrence responsive to the best matching time frame path signals.

7. A method for producing subunit speech patterns according to claim 5 wherein the step of producing an utterance time frame signal corresponding to the reference speech pattern subunit begin frame comprises determining the time of occurrence of the reference speech pattern subunit begin frame in the sequence of reference speech pattern time frames responsive to said first signal and selecting the utterance time frame corresponding to the best time alignment at said time of occurrence responsive to the best matching time frame path signals.

8. A method for producing subunit speech patterns according to claim 6 wherein the utterance modifying step comprises generating a scale factor signal representative of the ratio of the number of frames in the utterance to the number of frames in the reference speech pattern, and wherein the step of selecting the utterance time frame having the best time alignment with the determined reference speech pattern subunit endframe comprises detecting the modified utterance time frame corresponding to said determined reference speech pattern subunit endframe responsive to said best matching time frame path signals, and multiplying the detected modified utterance endframe signal by said scale factor signal.

9. A method for producing subunit speech patterns according to claim 7 wherein the utterance modifying step comprises generating a scale factor signal representative of the ratio of the number of utterance frames to the number of reference speech pattern frames, and wherein the step of selecting the utterance time frame having the best time alignment with the determined reference speech pattern subunit begin frame comprises detecting the modified utterance time frame corresponding to said determined reference speech pattern subunit begin frame responsive to said best matching time frame path signals, and multiplying the detected modified utterance begin frame signal by said scale factor signal.

10. A method for producing subunit speech patterns according to claims 1, 2, 3, 4, 5, 6, 7, 8 or 9 wherein each reference speech pattern is a reference word speech pattern and each subunit speech pattern is a subword unit speech pattern.

11. Apparatus for producing subunit speech patterns comprising means for storing a plurality of reference speech pattern templates, each template comprising a time frame sequence of acoustic feature signals representative of a prescribed spoken reference speech pattern and for storing a set of signals representative of the time of occurrence of at least one predetermined subunit in the reference speech pattern template for each reference speech pattern; means for analyzing an utterance of one of said stored reference speech patterns to generate a sequence of acoustic speech signals representative of the utterance; means for generating signals representative of the time alignment of the utterance feature signal sequence and the stored reference speech pattern feature signal sequence; and means for determining the sequence of utterance feature signals coresponding to the predetermined subunit in said stored reference speech pattern template responsive to the time alignment signals and the reference subunit time of occurrence representative signals.

12. Apparatus for producing subunit speech patterns according to claim 11 wherein said subunit time of occurrence signal storing means comprises means for storing a first signal representative of the time frame of the reference speech pattern template at which said subunit begins and for storing a second signal representative of the time frame at which said subunit terminates; and said selecting means comprises means responsive to said time alignment signals for detecting a first time frame of the utterance corresponding to said first signal and a second time frame of the utterance corresponding to said second signal, and means for storing the utterance feature signals of the interval from said first time frame to said second time frame.

13. Apparatus for producing subunit speech patterns according to claim 12 wherein said means for generating time alignment signals comprises means for modifying said utterance feature signals to match the number of time frames in said utterance to the number of time frames in said stored reference speech pattern template jointly responsive to the utterance feature signals and the stored reference speech pattern feature signals.

14. Apparatus for producing subunit speech patterns according to claim 13 wherein said means for generating time alignment signals further comprises means for producing a set of signals representative of the best matching time frame path between the sequence of modified utterance feature signals and the sequence of reference speech pattern feature signals jointly responsive to the modified utterance feature signals and the reference speech pattern feature signals.

15. Apparatus for producing subunit speech patterns according to claim 14 wherein said means for detecting the first and second utterance time frames comprises means for producing a signal representative of the utterance time frame corresponding to the reference subunit begin frame responsive to said first signal and said best matching time frame path signals, and means for producing a signal representative of the utterance time frame corresponding to the reference subunit endframe responsive to said second signal and said best matching time frame path signals.

16. Apparatus for producing subunit speech patterns according to claim 15 wherein said utterance time frame detecting means comprises means for comparing said first signal to the sequence of reference speech pattern time frames to generate a subunit begin frame signal, means for comparing said second signal to the sequence of reference speech pattern time frames to generate a subunit endframe signal, means responsive to said reference subunit begin frame signal and said best matching time frame path signals for producing a signal representative of the utterance time frame corresponding to the reference subunit begin frame, and means responsive to said reference word subunit endframe signal and said best matching time frame path signals for producing a signal representative of the utterance frame corresponding to the reference subunit endframe.

17. Apparatus for producing subunit speech patterns according to claim 16 wherein the means for producing an utterance time frame signal corresponding to the reference word subunit endframe comprises means responsive to said second signal for determining the time of occurrence of the reference word subunit endframe, and means responsive to the best matching time frame path signals for selecting the utterance time frame corresponding to the best time alignment at said time of occurrence.

18. Apparatus for producing subunit speech patterns according to claim 16 wherein the means for producing an utterance time frame signal corresponding to the reference speech pattern subunit begin frame comprises means responsive to said first signal for determining the time of occurrence of reference speech pattern subunit begin frame, and means responsive to the best matching time frame path signals for selecting the utterance time frame corresponding to the best time alignment at said time of occurrence.

19. Apparatus for producing subword unit speech patterns according to claim 17 wherein the utterance modifying means comprises means for generating a scale factor signal representative of the ratio of the number of frames in the utterance to the number of frames in the reference speech pattern; and wherein the means for selecting the utterance time frame corresponding to the determined reference word subunit endframe comprises means responsive to said best matching time frame path signals for detecting the modified utterance time frame corresponding to said determined reference speech pattern subunit endframe and means for multiplying the detected modified utterance endframe signal by said scale factor signal.

20. Apparatus for producing subunit speech patterns according to claim 18 wherein the utterance modifying means comprises means for generating a scale factor signal representative of the ratio of the number of utterance frames to the number of reference speech pattern frames; and wherein the means for selecting the utterance time frame corresponding to the determined reference speech pattern subunit begin frame comprises means responsive to said best matching time frame path signals for detecting the modified utterance time frame corresponding to said determined reference speech pattern subunit begin frame, and means for multiplying the detected modified utterance begin frame signal by said scale factor signal.

21. Apparatus for producing subunit speech patterns according to claims 11, 12, 13, 14, 15, 16, 17, 18, 19 or 20 wherein each reference speech pattern is a reference word speech pattern and each subunit speech pattern is a subword unit speech pattern.

* * * * *